United States Patent [19]

Phong-Anant

[11] Patent Number: 4,506,631
[45] Date of Patent: Mar. 26, 1985

[54] PROCESS TO PRODUCE HYDROGEN AND OXYGEN UTILIZING THE ENERGY CONTENT OF WASTE MATERIALS

[75] Inventor: Dheera Phong-Anant, New Lambton Heights, Australia

[73] Assignees: Lawrence Waldemar Ihnativ; Alan Bruce Squire, both of New South Wales, Australia

[21] Appl. No.: 506,879

[22] Filed: Jun. 22, 1983

[30] Foreign Application Priority Data

Jun. 22, 1982 [AU] Australia ............................ PF4533

[51] Int. Cl.³ .................................................. C25B 1/04
[52] U.S. Cl. ...................................... 122/2; 122/4 D; 110/245; 290/2; 290/52; 204/129
[58] Field of Search ................. 204/129; 290/2, 52; 122/4 D, 2; 110/245

[56] References Cited

U.S. PATENT DOCUMENTS

| | | | |
|---|---|---|---|
| 3,052,612 | 9/1962 | Henegar et al. | 204/128 |
| 3,403,643 | 10/1968 | Denig | 110/10 |
| 3,511,194 | 5/1970 | Stookey | 110/10 |
| 3,706,662 | 12/1972 | Wellford | 210/63 |
| 3,733,271 | 5/1973 | Olsen | 210/63 |
| 3,759,036 | 9/1975 | White | 60/39.25 |
| 3,829,368 | 8/1975 | Wesley | 204/DIG. 3 |
| 3,863,577 | 2/1975 | Steever et al. | 110/245 |
| 3,917,239 | 11/1975 | Rhinehart | 266/16 |
| 3,924,402 | 12/1975 | Harboe | 122/4 D |
| 3,926,582 | 12/1975 | Powell | 48/62 |
| 3,937,023 | 2/1976 | Williamson | 60/670 |
| 4,019,896 | 4/1977 | Appleby | 75/44 |
| 4,041,906 | 8/1977 | Edwards | 122/2 |
| 4,080,271 | 3/1978 | Brown | 204/78 |
| 4,253,425 | 3/1981 | Gamble et al. | 122/4 D |
| 4,270,470 | 6/1981 | Barnett et al. | 110/346 |
| 4,291,636 | 9/1981 | Bergsten et al. | 110/346 |
| 4,376,373 | 3/1983 | Weber et al. | 122/2 |
| 4,380,147 | 4/1983 | Zaba | 122/4 D |
| 4,393,814 | 7/1983 | Sievert | 122/2 |
| 4,395,956 | 8/1983 | Hand et al. | 110/248 |
| 4,398,998 | 8/1983 | Quame | 122/2 |
| 4,406,128 | 9/1983 | Fanaritis et al. | 122/4 D |

*Primary Examiner*—R. L. Andrews
*Attorney, Agent, or Firm*—John J. Byrne; Bradford E. Kile; Kevin M. O'Brien

[57] ABSTRACT

The invention describes a process wherein high-purity hydrogen and oxygen gases can be economically produced via a water electrolysis method, utilizing cheap energy recovered from an incineration process of industrial, municipal, agricultural and other waste materials in a fluidized-bed incinerator. In the said process combustible solid and/or liquid wastes with high energy content are exploited to supply the energy required to incinerate and decompose other solid or liquid wastes with lower or no energy content. Also the process provides a method wherein any solid, liquid or gaseous emissions or effluents from the process are effectively trapped, controlled and converted to environmentally acceptable, inert and harmless products. Also the process includes an energy recovery system such that the thermal energy from the incineration is used to produce steam and generate electricity required for all operations in the process including the production of oxygen. The process does not merely provide competitive and economical means of producing hydrogen and oxygen but also an effective and ultimate disposal method of undesirable and troublesome waste material. It, therefore, is a basis for a profitable commercial operation that combines waste disposal services and manufacturing of marketable products with very low operating costs and flexibility of energy utilization for various industrial and commercial application in either small or large multiple scale.

9 Claims, 2 Drawing Figures

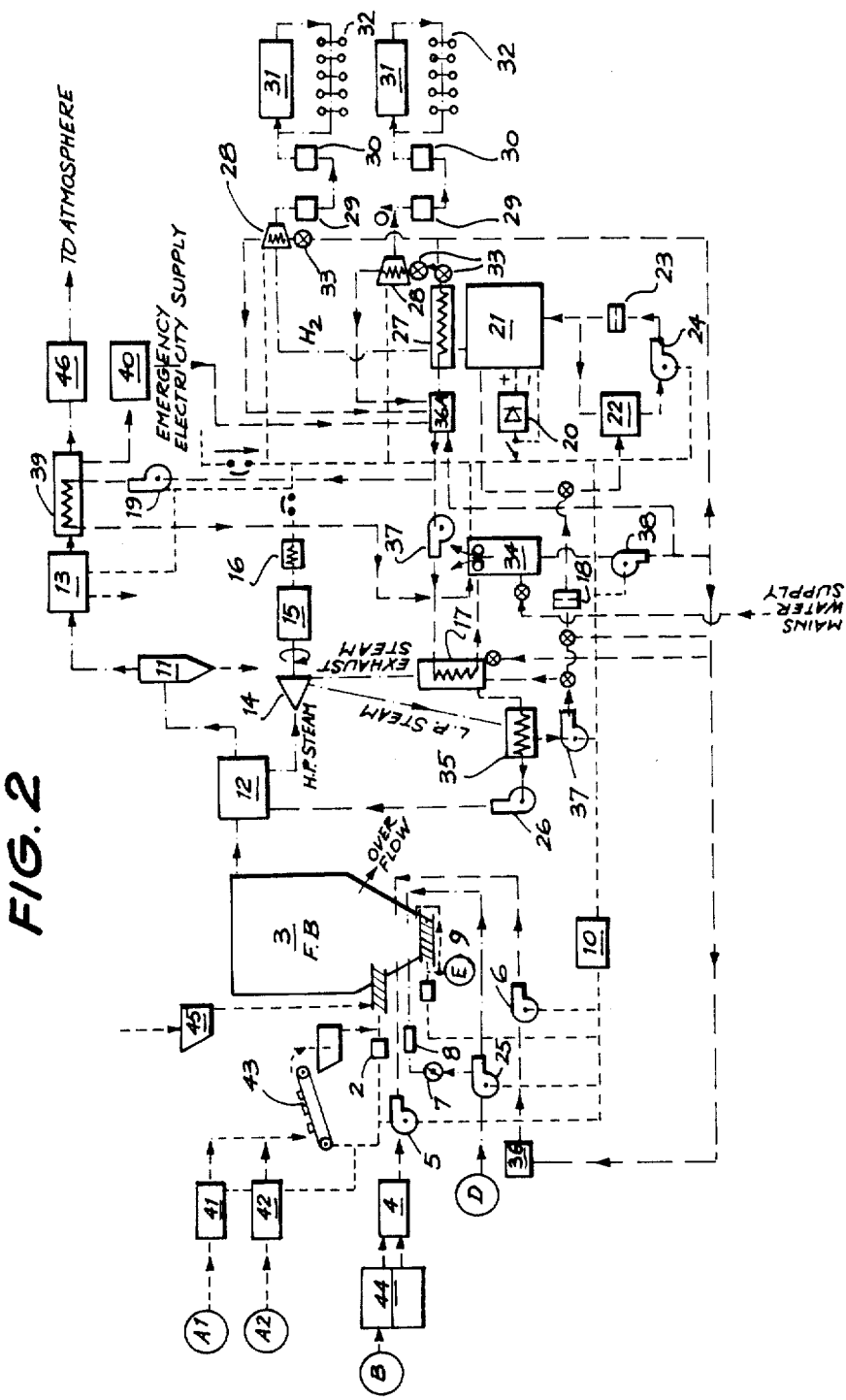

PROCESS TO PRODUCE HYDROGEN AND OXYGEN UTILIZING THE ENERGY CONTENT OF WASTE MATERIALS

BACKGROUND OF INVENTION

The production of hydrogen and oxygen by the electrolysis of water has been practised on the industrial scale since the beginning of this century. In recent years, the economics of hydrogen and oxygen production have been influenced by the cost of electrical power. As a result, cheaper larger scale production of hydrogen has been carried out using coal, oil and natural gas. However, due to increasing prices and limited availabilities of these fossil fuels, other methods of hydrogen production have been considered. These methods include the use of solar energy, off-peak electrical power and possibly nuclear power.

By using waste materials as an energy source to generate electricity at a negligible operation cost, the electrolytic hydrogen and oxygen can be readily produced on a very competitive basis (although still on the smaller scale) when compared with current practices. Furthermore, the electrolyte method has certain intrinsic advantages. The method is well proven with high energy conversion efficiencies of 45-65 percent. Higher efficiencies could be obtained by the implemetation of the latest technology. High purity gases are readily produced. The equipment can be operated automatically in a safe manner and continuous gas production can be ensured by the use of back-up mains power.

The other aspect of concern is the ultimate disposal of undesirable and some intractable liquid and solid wastes. Since there is no ultimate means of disposal such as complete incineration yet available in Australia, the accumulation of these 'difficult' wastes in considerable and causing a very serious environmental problem.

At the present, the dumping of industrial and/or toxic liquid wastes is not permissible at the council tips. Liquid wastes generally include biological, chemical and combustible liquid such as sewage sludge, acids, alkalines, used oils, organic solvents and some highly toxic chemicals and pesticides. Only some non-toxic wastes such as diluted acids which can be treated and neutralised may be transported to a Metropolitan Waste Authority's depot and then disposed of at considerable cost. The remaining waste of a more toxic nature, are presently either stored or dumped illegally. Obviously these methods are unsatisfactory.

The accumulation of many thousands of used rubber tires and enormous amounts of spent cathode linings generated from aluminum smelters also gives rise for concern. Satisfactory disposal facilities for these wastes do not currently exist in the region.

Another type of waste is coal washery reject. Most of this consists of coarse and fine rejects. The former is usually dumped in heaps or used as fill in gullies. The latter which is made up mainly of a slurry of fine coal and soil particles is usually disposed of in settling ponds. Over the decades millions of tonnes of colliery waste have accumulated, taking up large areas of valuable land and sterilizing coal reverses. Furthermore, these dumps can creat problems of dust, fire and water pollution. These wastes could be disposed of by incineration in large, high-temperature furnaces. This method involves a very high initial cost, especially if air pollutants are to be controlled. To operate efficiently, this tye of furnace would require wastes or external fuel containing high levels of combustible materials of high energy content due to its low thermal inertia and need to control combustion stability. On the other hand, smaller and cheaper fluidised-bed incinerators can be operated at lower temperatures without the above disadvantages and are therefore a more acceptable alternative.

OBJECTS OF THE INVENTION

With the foregoing in mind, the objects of the invention are:

(a) To provide a process to produce high-grade hydrogen and oxygen gases in a highly efficient and economical manner utilising cheap energy from waste materials.

(b) provide an effective method for ultimate disposal of various types of undesirable and some intractable liquid and solid wastes using a commercial fluidised-bed incinerator.

(c) Recover energy from the incineration of waste materials and to convert it into various forms of useful energy. These include heat, steam, electricity and combustible fuel (hydrogen). The hydrogen may be used in the plant operation, or as supplementary energy to other industrial processes or applications, or sold as a product.

(d) Provide methods of controlling and minimising the emissions of effluents which may cause air or water pollution.

(e) Recover any potable water from the undesirable liquid wastes and minimise the consumption of a scarce resource.

(f) Provide a flexible unit operation which can be readily installed for a commercial application using proven and off-the-shelf components. The plant operation is small enough for a small scale requirement or can be easily expanded in multiple units for larger operations.

The present invention provides a method of producing high purity hydrogen and oxygen utilising energy from disposal of solid and liquid wastes comprising the steps of:

(i) reducing said solid waste to a suitable size and recovering any metal waste therefrom;
(ii) feeding said solid and liquid wastes to a fluidised bed incinerator together with sufficient air and optionally fuel to maintain optimum incineration conditions;
(iii) recovering thermal energy from said incinerator;
(iv) converting said thermal energy into electricity; and
(v) removing or minimising pollutant species from solid, liquid and gaseous emissions of said incinerator, characterised in that said hydrogen and oxygen are produced by electrolysis using the electricity produced in step (iv).

Typical wastes treatable by the process of the present invention include such materials as discarded rubber tires, spent cathodes from aluminium smelters, plastics, wood, paper, cereal straws, coarse coal rejects, tailings slurries from coal preparation processes, printing wastes, pesticide wastes, abbatoir effluent, sewage sludge, spent oils, oil sludges, acids, alkalis, and other chemical and biological wastes including noxious materials.

The incinerator may be of a type that is operated at atmospheric pressure or that is pressurised and operated at elevated pressures.

The energy released from the incineration of waste materials may be recovered to produce steam in a boiler, to drive a steam turbine, and/or in the form of hot flue gas used to drive a gas turbine, both of, or either of which can be used to drive a generator/alternator to produce electricity consumed by the fluidised-bed incinerator, electrolyser, and other apparatus or components related to the process and system of the invention. Portions of hot flue gas or steam may be extracted and exploited for other heating or drying processes. Excess electricity and steam can also be sold.

The said waste materials, solid and/or liquid, toxic or non-toxic may be treated and mixed in the system in such manner as the energy content of the combustible wastes sufficiently sustains the combustion of other non-combustible wastes and produce sufficient energy for the processes without or with minimum requirement of external fuel.

Emissions and/or effluents from the process in the forms of particulate matter, noxious gases and liquid pollutants are trapped, absorbed scrubbed or treated to minimum or well below accepted standard levels, and/or converted into inert or harmless materials suitable for normal land fill or sewage discharge.

Significant amounts of water can be recovered from the incineration of liquid wastes in the process such that it may be utilised in the process.

The operation can be utilised and installed on a commercial basis to produce marketable products, namely, heat steam, electricity, hydrogen, oxygen, potable water, inert ash, recovered metals and provide services for disposal of all types of waste materials.

DESCRIPTION OF FIGURES

FIG. 2 shows schematically detailed operations of the preferred process.

In FIG. 1, the dashed line represents optional steps. In FIG. 2, the short dashed lines represent solids flow or solids wastes. The long dashed lines represent flow of water, condensate, electrolyte or liquid wastes. The dot-dashed lines represent flow of air, gases or steam. The dotted lines represent electrical circuits.

BRIEF DESCRIPTION OF THE PROCESS

Figure 1:
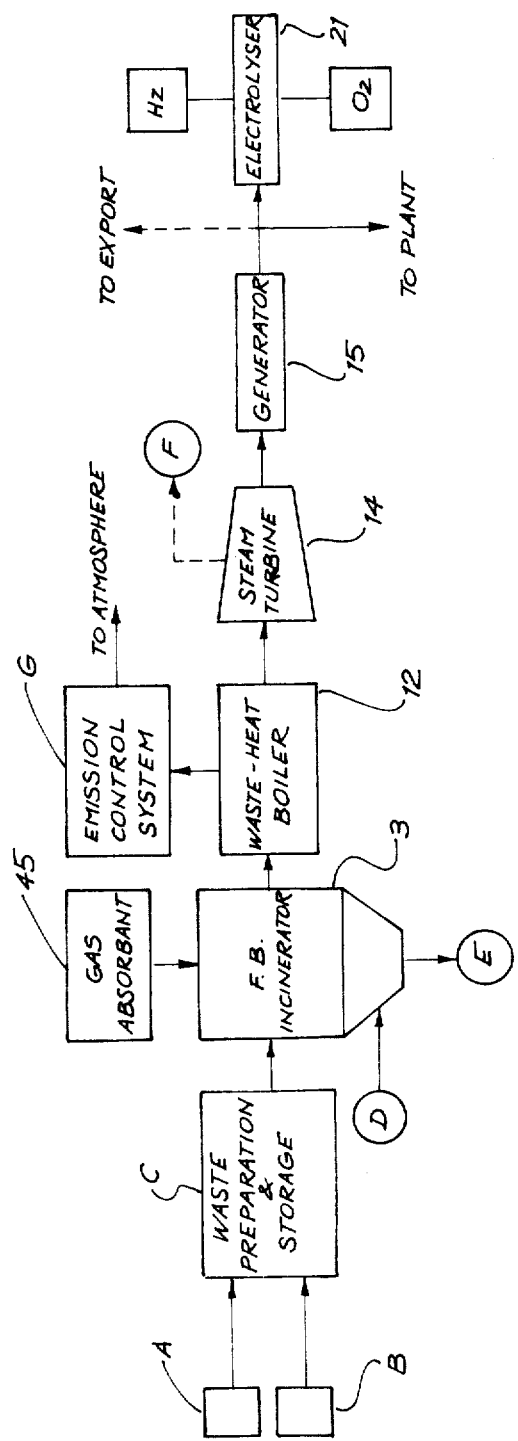
FIG. 1 shows a brief schematic diagram of the preferred process according to the present invention.

A general view of the process schematically described in FIG. 1 consists of the following stages.

1. Waste Classification and Preparation

All liquid wastes A delivered to the plant are first identified and stored or mixed at C according to type and energy content. Solid wastes B will undergo size reduction and metal recovery in the preparation plant C prior to incineration.

2. Waste Incineration

Prior to the initial introduction of waste the fluidised-bed incinerator 2 is fired by using an auxiliary burner until a temperature of approximately 800° C. is reached. Wastes of varying content will either be premixed or fed into the incinerator in such ratios that the combustion is self-sustaining at the required operating temperature range of 700°–1,000° C. The auxiliary burner may then be dispensed with.

The waste feed rate, air D requirements and temperature levels of the incinerator will be monitored and automatically controlled by microprocessors to maintain optimum incineration conditions.

3. Energy Recovery and Utilisation System

Heat or thermal energy from the incinerator is recovered to produce steam in a waste heat boiler 12. This steam is then used to drive a turbine 14 generator unit 15 to produce electricity.

Utilisation of the energy can be very flexible. Low-pressure steam F may be extracted for heating or drying processes in other unit operations if there is such a demand. A portion of the hot flue gas may also be redirected to a drying unit to reduce moisture content of some liquid wastes. In the event that coal washery tailings are being burnt, the solid-content can be improved, in this manner increasing the specific energy value of the waste.

The electrical energy will be generally consumed in all stages of the operation. Excess electricity is primarily used to produce hydrogen and oxygen via a water electrolysis process 21 or can be sold or used for other applications when the demand for the gases is low.

4. Emission Monitoring and Controls

The process incorporates a system where the pollution emissions from the incineration is continuously monitored and controlled.

Particulate matter such as fly ash and elutriated solid material from the fluidised-bed incinerator 3 is trapped in the dust collection system G. Incineration of liquid waste will produce steam in the flue gas which is condensed into water and recovered for use within the process. Any noxious gases such as sulfur dioxide, hydrogen chloride, and hydrogen fluoride, may be trapped by adding gas absorbents 45 to the fluidised-bed 3. The remaining pollutant gases, if any, will be finally and totally scrubbed in the final gas scrubber G prior to release to the atmosphere.

Particulate matter and other air pollutants such as sulfur oxides, nitrogen oxides, chlorine, hydrogen chloride, and fluoride will be continuously monitored to provide the proper control measure of the final plant emissions.

DETAILED DESCRIPTION OF THE APPARATUS AND PROCESS

FIG. 2 illustrates a flow diagram for a typical operation. During the waste preparation stage, various types of solid and liquid wastes A are accepted and processed prior to incineration. Lights solid wastes A1 such as paper, plastic and rubber tires are reduced to a small size in the shredder 41. Other heavy and hard solid materials A2 such as wood and spent cathode coke are crushed in the crushing machine 42. Sized solid waste is then transported by the conveyor 43 to a storage bin or hopper 1. From the hopper 1 solid waste is fed into the fluidised-bed incinerator 3, by screw-feed 2. Any required gas-absorbent material may be fed from the hopper 45 via screw-feed 2 to the fluidised-bed 3.

Liquid wastes B are stored in the storage tanks 44 according to types and energy contents. These liquids are mixed in the mixing tank 4 prior to being pumped by the liquid waste pump 5 to be injected into the incinerator 3.

Combustion air D is injected into the fluidised-bed incinerator 3 by means of air blower 25. This air is injected through a bed of sand or ash in such a manner that the bed particles become suspended or fluidised. The bed is initially supplied with heat from a start-up burner 8 which supplies the initial heat using a fuel gas such as hydrogen, natural gas or liquified petroleum gas or even fuel oil. The burner air supply is controlled by control damper 7. When the bed 3 reaches a temperature of 800° C. wastes are then introduced. As a result combustion continues with thermal energy released from the combustible waste without the auxiliary burner 8.

The fluidised-bed incinerator 3 is operated at atmospheric pressure with typical operating temperatures in the range of 700°-1,000° C. and a fluidising velocity ranging from 1 to 5 meters per second. Higher temperatures may be required in certain cases such as when burning materials which are highly stable or have strongly bound structures such as some aromatic compounds. The maximum temperature is limited by the softening point of the bed material. If sand is used, temperatures should be maintained below 1200° C. to avoid softening and consequent agglomeration of the particles. The temperature is generally controlled by the fuel and air input, auxiliary burner 8, and quenching water supplied to the bed by pump 6 from water tank 36. Control of the incinerator 3 is monitored at control panel 10.

Heat from the hot flue gas is recovered in waste-heat boiler 12. High pressure steam from the boiler 12 is used to drive steam turbine 14, which in turn drives generator or alternator unit 15. The operation of the turbine 14 and generator 15 is controlled by automatic control 16. To improve the thermal efficiency of the system some low-pressure steam is extracted to preheat the boiler feed water using a feed-water heat/evaporator 35. Condensate is pumped by circulating pump 37, to be further condensed in the condenser 17, together with the exhaust steam from the turbine 14. The water is then preheated and delivered to boiler 12 by boiler feed pump 26.

The cooling water for the condenser 17 is circulated by pump 37 fromthe surge/make-up water tank 36A and later loses its absorbed heat at cooling tower 34. The water supply to other stages is delivered by a pump 38 from the cooling tower 34 and any make-up water from the water mains supply.

Alternating current power generated is used to drive all of the machinery in the process. Excess power is delivered to the electrolyser unit 21. The A.C. power is converted to direct current power by the inverter 20. Electrolyte, such as KOH or NaOH solution, is supplied from the electrolyte tank 22 by electrolyte pump 24 through filter 23 to the electrolyser 21.

Hydrogen and oxygen produced by electrolysis are cooled by gas cooler 27 prior to being compressed by compressors 28. The compressed gases are purified in purification units 29 and dried by dehydration units 30 then stored in storage tanks 31. The gas products may be placed into cylinders or bulk carriers at filling station 32.

Cooling water for the gas cooler 27 and compressors 28 is circulated by the pump 38 and returned to the water tank 36A. Water flows are controlled by control valves 33.

In the emission control system, coarse dust and coarse fly ash is separated from the gas stream by means of dust cyclone 11. Fine particulate is further removed in the fine dust collector 13 such as an electrostatic precipitator or a bag filter. The collected dust can be safely disposed of in the usual manner. Steam in the flue gas is condensed in another condenser 39 which cooling water circulated by pump 19 back to the cooling tower 34. Recovered water is neutralised and treated in water treatment unit 40 and added to the system at the water tank 36A.

Due to the low-temperature operation of the fluidised-bed system, the nitrogen oxides, emission (which depends on the combustion temperature, the excess air ratio and nitrogen content of the waste material) can be kept well below the emission standard. $SO_2$ may be tapered inside the fluidised-bed 3 by absorbent material such as limestone or dolomite to form inert sulfate salts which can be safely discarded with the ash. Other noxious gases may be either similarly treated in the fluidised-bed 3 by selective absorbents or scrubbed in the final gas scrubber 46. Only clean and harmless gases such as nitrogen, carbon dioxide and excess oxygen are emitted from the process. Excess ash and extraneous materials such as heavy metals are removed from the bottom of the fluidised-bed 3 via a screw type mechanism 9. The unwanted heavy materials are removed and the fine bed material is recycled back to the bed 3.

TYPICAL PLANT OPERATIONS

A typical plant operation outlined below is based on a study on waste availability in the Hunter Region, New South Wales, Australia.

The plant requires 2 fluidised-bed incinerators, each having nominal combustion capacity of 24,000 megajoules per hour, MJ/hr, (e.g. a 4-$m^3$ Pyrecon unit).

When operated at 75% capacity, and allowing for 10% heat loss from the fluidised-bed unit, the heat output from the incinerators is $Q_F = 32,400$ MJ/hr.

Assuming that the inlet temperature of the flue gas to the waste heat boiler is 800° C. and the boiler efficiency = 80%, the heat transferred to the steam is $Q_s = 25,920$ MH/hr.

Assuming the boiler produces superheated steam at 600 psig and 400° C. with feed water of 93° C. at 750 psia. The steam capacity is $m_s = 9,195$ kg/hr.

Without steam extraction for other purposes, the expected power converted to useful work (mechanical) from the turnine is $W_t = 1,250$ kw.

Assuming that the power factor of the generator is 0.85, the electrical power available is $P_E = 1,062$ kw.

To operate the plant a maximum of 300 kw of power is required, leaving excess energy of about 760 kw for hydrogen/oxygen production. To produce 1 $m^3$ of $H_2$ (at N.T.P.) a typical electrolyser (e.g. BAMAG) would require approximately 4.5 kw-hr. This yields $H_2$ and $O_2$ at a rate of 170 and 85 $m^3$ per hour, respectively.

TYPICAL WASTE MIXTURE

The ratio of solid and liquid wastes fed to the incinerator depends mainly on the energy content of each waste. A typical feed is a combination of rubber tires and a liquid waste mixture.

It has been assumed that tires have a specific energy content of about 35 MJ/kg and that the liquid wastes mixture has a specific energy content of, in an extreme case, −4 MJ/kg (i.e. mainly water). To achieve an overall waste specific energy content of about 10 MJ/kg, the average feed rate of tires and liquid waste to each incinerator are 862 and 1538 kg/hr respectively for overall 75% input capacity.

A typical analysis of rubber tires shows the following composition, as fired:
Carbon: 83%
Hydrogen: 7%
Oxygen: 2.5%
Nitrogen: 0.3%
Sulfur: 1.2%
Rubber: 50%
Carbon Black: 27.5%
Oil: 17.5%
Ash: 5%

Also assuming the liquid waste mixture in an extreme case, is mainly composed of water, for each 1 kg of rubber tire the air requirement, operating at 20% excess air is 14.32 kg of air. That is, the air consumption for each hour is, $$m_{air} = 12.34 \text{ tonnes/hr.}$$

Combustion products amount of $CO_2$, $SO_2$, $NO_2$, $O_2$, $N_2$ and $H_2O$, by volume
$CO_2$: 11.36%
$O_2$: 2.85%
$N_2$: 63.62%
$SO_2$: 500 ppm
$NO_2$: <100 ppm
$H_2O$ (stream): 22.09%
Total products = 14.7 tonnes/hr.

About 2 tonne of water may be recovered per hour. This is sufficient to supply all the water requirement for electrolysis and make-up water for any loss at the cooling tower and the boiler.

The extra ash produced in the incinerator amounts to about 43 kg/hr. Considering that there is about 4 tonne of bed material in each fluidised-bed, the loss of bed material by elutriation may be made up by this ash as well as the recycled dust from cyclone II (FIG. 2).

Another example of waste mixture is spent cathode waste and liquid wastes. The typical composition of cathode waste from an aluminium smelter is, by weight,
Silicates: 11%
Carbon: 70%
Fluoride: 3.0%
Sodium: 4.0%
Calcium: 0.9%
Aluminium: 0.8%
Iron: 0.06%
Sulfur: 0.06%
Cyanides: <30 ppm A typical feed rate for each incinerator consists of 1244 and 1156 kg of cathode waste and liquid wates (mainly water), per hour. The air requirement of 20% excess air is about 12 tonne/hr. The throughput of fluorides will be about 37 kg/hr which can be mostly absorbed by adding absorbent such as activated alumina powder inside the bed itself. The remaining fluorides are trapped in the dust collection system and the final gas scrubber. Cyanides will decompose during combustion into nitrogen, water and carbon dioxide. Excess ash and heavy metals (iron and aluminium) can be subsequently removed from the bed and disposed of or recycled. Water recovery is reduced to about 1 tonne/hr for this case.

I claim:

1. A self sustaining continuous process for production of high purity hydrogen and oxygen by the disposal of solid and liquid, combustible and non-combustible wastes, which process comprises the steps of:
   (i) reducing said solid waste to a suitable and uniform size and recovering metal waste therefrom,
   (ii) drying said reduced solid waste,
   (iii) feeding said solid and liquid wastes to a fluidised-bed incinerator operated at at least atmospheric pressure together with combustion air and hydrogen produced by electrolysis wherein the ratio of combustible to non-combustible feeding materials and air supply is controlled and regulated such that the requirement for supplementary fuel is either eliminated or minimized and the optimum incineration conditions are continuously maintained,
   (iv) recovering water produced from incineration of said liquid wastes,
   (v) recovering thermal energy from said incinerator in a heat recovery means to produce steam which is used to drive a steam turbine,
   (vi) employing said heat recovery means or said steam turbine to drive a generator alternator to produce electricity,
   (vii) producing hydrogen and oxygen from at least a portion of the water of step (iv) by electrolysis using at least a portion of the electricity of step (iv),
   (viii) removing pollutant species from solid, liquid and gaseous emissions of said incinerator,
   (ix) recycling a portion of the hydrogen of step (vii) to the fluidised-bed incinerator of step (iii) as fuel and recycling a portion of the oxygen of step (vii) when additional excess oxygen is required for the incineration,
   (x) recycling a portion of the electricity of step (vi) to operate other steps of the process as required,
   (xi) recycling a portion of the water of step (iv) to operate other steps of the process where water is consumed, and
   (xii) employing the thermal energy from said incinerator as heat in other steps of the process where heat is consumed.

2. The process as defined in claim 1 wherein said heat recovery means is a gas turbine.

3. The process as defined in claim 1 wherein said heat recovery means is a waste heat boiler.

4. The process as defined in claim 1 wherein said heat recovery means and said steam turbine are employed to drive said generator or alternator.

5. The process as defined in claim 1 wherein said thermal energy employed in step (xii) comprises steam or hot exhaust gases.

6. The process as defined in claim 1 wherein said thermal energy employed in step (xiii) comprises both steam and hot exhaust gases.

7. The process as defined in claim 1 wherein said waste is selected from the group comprising tires, spent cathode linings and coal tailings.

8. The process as defined in claim 1 wherein said waste comprises toxic liquid organic or inorganic liquid wastes.

9. The process as defined in claim 1 wherein said output products and by products are selected from the group consisting of high purity or industrial grades of liquid or gaseous oxygen or hydrogen; potable water; high pressure and low pressure steam; minerals, metals and out aggregate; and electricity in the form of alternating current or direct current.

* * * * *